United States Patent [19]

Mains et al.

[11] 4,062,819

[45] Dec. 13, 1977

[54] POLYAMIDE BLENDS HAVING IMPROVED PROCESSING CHARACTERISTICS

[75] Inventors: Harold E. Mains; Frederick R. Williams; William L. O'Brien, all of Cincinnati, Ohio

[73] Assignee: Emery Industries, Inc., Cincinnati, Ohio

[21] Appl. No.: 720,535

[22] Filed: Sept. 7, 1976

[51] Int. Cl.² .............................................. C08L 77/08
[52] U.S. Cl. ............................ 260/18 N; 260/78 A; 260/78 L; 260/857 TW
[58] Field of Search .......... 260/18 N, 857 TW, 78 A, 260/78 L

[56] References Cited

U.S. PATENT DOCUMENTS

| | | | |
|---|---|---|---|
| 2,824,848 | 2/1958 | Witcoff | 260/857 TW |
| 3,342,762 | 9/1967 | Crovatt, Jr. | 260/18 N |
| 3,542,720 | 11/1970 | Kolyer et al. | 260/857 TW |
| 3,755,221 | 8/1973 | Hitch | 260/18 N |

FOREIGN PATENT DOCUMENTS

| | | |
|---|---|---|
| 1,128,121 | 9/1968 | United Kingdom. |
| 1,126,213 | 9/1968 | United Kingdom. |

*Primary Examiner*—Eugene C. Rzucidlo
*Attorney, Agent, or Firm*—Gerald A. Baracka; John D. Rice

[57] ABSTRACT

The flow characteristics and rheological properties of high molecular weight thermoplastic polyamides are significantly improved by blending therewith a small amount of a polyamide derived from high molecular weight dibasic acids. In addition to improving the processability of the thermoplastic resin, the blends and manufactured articles produced therefrom have other desirable properties.

15 Claims, No Drawings

POLYAMIDE BLENDS HAVING IMPROVED PROCESSING CHARACTERISTICS

BACKGROUND OF THE INVENTION

Various polyamide blends are known and utilized for a variety of purposes. For example, U.S. Pat. No. 2,339,237 discloses a blend of a polyamide soluble in water, alcohols and mixtures thereof with a polyamide which is insoluble in said solvents. The resulting blended compositions have enhanced water absorption properties and improved physical characteristics. Also, to improve the properties of gelled and partially gelled nylon 6,6 British Pat. No. 1,128,121 discloses blending therewith 5-20 weight percent nylon 6 or nylon 11.

Polyamides derived from polymeric fatty acids, such as dimer acid, have also been blended. In U.S. Pat. No. 2,839,219 hard tough polyamide resins obtained by the condensation of an aliphatic polyamine with a mixture of acids including polymeric fatty acids are blended with soft, tacky polyamide resins obtained by the condensation of a polyalkylene polyamine with polymeric fatty acids to obtain improved adhesive compositions. Still another reference, U.S. Pat. No. 3,645,932, teaches the nucleation of polyamide resins derived from polymeric fatty acids in order to rapidly develop crystallinity and physical properties. This is achieved by incorporating from about 0.1 to 10 weight percent of a nucleating agent which can include nylon 6, nylon 6,6, nylon 6,10, nylon 11, nylon 12, and the like.

It is also well known that the rheological properties of the polyamide resin are an important consideration if it is to be effectively and efficiently extruded, molded, milled or otherwise processed. Typically, additives such as metal soaps and various natural and emulsified waxes are employed to control and/or modify the flow characteristics of the melt during processing. These additives are not always acceptable, however, since they often detract from the desirable physical properties of the resin and result in inferior manufactured products. Also, incompatibility of the additive with the polyamide can be a problem. It would be highly advantageous if the flow characteristics and rheological properties of high molecular weight thermoplastic polyamide resins, such as nylon 6 or nylon 6,6, could be improved by blending a minor amount of a readily compatible second polyamide component therewith. It would be even more desirable if the polyamide employed in minor amount was readily available and if the resulting blends, in addition to having improved rheological properties and processability, had other desirable properties.

SUMMARY OF THE INVENTION

We have now quite unexpectedly discovered polyamide blends having improved processing characteristics. Quite surprisingly we have found that polyamide additives derived from high molecular weight dibasic acids function as multipurpose processing aids when incorporated in "nylon-type" resins and are effective even at very low levels. The polyamide additives of this invention can be readily incorporated into nylon 6, nylon 6,6 and other nylon plastics, are readily compatible with the resins and compounding ingredients typically employed therewith, and do not detract from the desirable physical characteristics of the nylon. Additionally, these additives impart other desirable properties to the nylon resins. Even when used at low levels these additives do not exude or migrate from the nylon and form undesirable sticky or oily residues on the surface of articles manufactured therefrom. In extrusion applications the present polyamide blends make it possible to use lower extrusion temperatures and less power while maintaining throughputs equivalent to those obtained with nylon resins which do not contain polyamide additive. Alternatively, greater outputs are possible with equivalent temperatures and power consumption.

The polymer additives of this invention are high melting polyamides derived from high molecular weight dibasic acids. Polyamide resins of this type are known for adhesive applications and commercially available, however, it is totally unexpected that these polyamide resins can be advantageously blended with nylon resins to obtain improved thermoplastic compositions. The polyamide additives useful for this invention are high molecular weight products having a number average molecular weight from about 5,000 to 50,000 and, more preferably from about 10,000 to 35,000, obtained by the reaction of essentially stoichiometric amounts of a long-chain high molecular weight aliphatic or cycloaliphatic dibasic acid containing from about 18 to 52 carbon atoms, and optionally up to about 30 weight percent of a short-chain saturated dibasic acid containing from 2 to 13 carbon atoms, with an aliphatic saturated diamine or mixture of diamines containing from 2 to 10 carbon atoms. The polymeric additives typically have softening points in the range 100 to 240° C with amine values less than 3. Especially useful additives are those polyamides derived from polymeric fatty acids obtained by the dimerization of predominantly $C_{18}$ acids, particularly polymeric fatty acid products containing 75% by weight or more $C_{36}$ dimer acids, and mixed diamines differing in chain length by at least 3 carbon atoms and wherein the longer chain diamine constitutes from 5 to 35 equivalents percent of the total diamine. Even more preferable are those polymeric additives where azelaic acid, sebacic acid, dodecanedioic acid or brassylic acid are employed as part of the dibasic acid charge. The polyamide additives constitute 0.01 to 20 weight percent and, more preferably 0.1 to 10 weight percent, of the polymer blend. These additives are especially useful with nylon 4, nylon 6, nylon 6,6, nylon 6,9, nylon 6,10, nylon 6,12 nylon 9, nylon 11 and nylon 12.

DETAILED DESCRIPTION

This invention relates to improved polyamide blends consisting of (A) a "nylon-type" polyamide and (B) a minor amount of a polyamide derived from a high molecular weight dibasic acid. The invention has as its objective to provide improved polyamide compositions which during processing exhibit good flow characteristics and after processing have acceptable physical properties. It has now quite unexpectedly been found that by blending a small amount of a polyamide derived from high molecular weight acids, such as polymer acids, with a nylon resin such as nylon 6 or nylon 6,6 that it is possible to extrude the blend at lower temperatures while maintaining high throughput. Even more remarkably this is achieved without increasing the amount of power required to drive the extruder. The enhanced rheological characteristics of the blends also facilitate production of molded, milled and spun articles. In addition to the marked improvement in processability, the compositions often also exhibit improved flexibility, flexural strength and impact resistance. It has also been observed that strains initially present in complex molded articles obtained using these blends are relieved upon aging.

The "nylon-type" polyamides A are high molecular weight thermoplastic polymers derived from a single reactant or two or more reactants, said reactants having 12 carbon atoms or less. Products of this type are generally known and referred to throughout the industry as nylons or nylon plastics and are to be distinguished from the polyamides B obtained by the reaction of a long-chain dibasic acid containing 18 or more carbon atoms and a diamine or mixture of diamines. For the purpose of this invention and as used herein, "polyamide additive" refers to the latter class of polyamides (B) which generally constitute 20% by weight or less of the blend.

Nylon materials useful for this invention are conventionally obtained by (a) condensation of $C_{2-12}$, and more generally a $C_{6-12}$, diamine with a $C_{2-12}$, and more usually a $C_{6-12}$, dicarboxylic acid (b) by self-condensation of amino acids usually having from 7 to 12 carbon atoms and (c) by polymerization of lactams (cyclic amides produced from amino acids), most notably butyrolactam and caprolactam. High molecular weight nylon resins which are primarily useful for the preparation of the present blends include nylon 4 (prepared from butyrolactam), nylon 6 (prepared from caprolactam), nylon ,6 (prepared from hexamethylenediamine and adipic acid), nylon 6,9 (prepared from hexamethylenediamine and azelaic acid), nylon 6,10 (prepared from hexamethylenediamine and sebacid acid), nylon 6,12 (prepared from hexamethylenediamine and dodecanedioic acid), nylon 9 (prepared from 9-aminononanoic acid), nylon 11 (prepared from 11-aminoundecanoic acid) and nylon 12 (prepared from 12-aminododecanoic acid). In addition to the above-mentioned polyamides, other polyamides which can be modified in accordance with the present invention include, for example, poly(ethylene adipamide), polyethylene sebacamide), poly(hexamethylene dodecanediamide), poly(dodecamethylene adipamide), poly(dodecamethylene sebacamide), poly(tetramethylene dodecanediamide), poly(3-aminopropionic acid), poly(ethylene terephthalamide), poly(hexamethylene terephthalamide), poly(decamethylene terephthalamide), poly(decamethylene isophthalamide), poly(p-phenylenediethylene adipamide), poly(p-phenylenediethylene azelamide), poly(p-phenylenediethylene sebacamide), poly(m-phenylene sebacamide), poly(m-xylylene sebacamide), poly(4,4'-diphenylene terephthalamide), poly(1,4-cyclohexylene adipamide), poly(1,3-cyclohexylene azelamide), poly(1,4-cyclohexylenediemthylene sebacamide) and the like.

The polyamide additives B useful for the present invention are high melting resinous products obtained by the reaction of a long-chain dibasic acid containing 18 or more carbon atoms and a diamine or mixture of diamines. Some short-chain dibasic acids may also be included in the reaction. The long-chain, high molecular weight dibasic acids used in the preparation of the polyamide can be aliphatic or cycloaliphatic hydrocarbon acids containing 18 or more carbon atoms. The acids may be straight-chain, i.e., unbranched or contain one or more alkyl branches and the carboxyl groups can be located in the terminal positions or randomly throughout the molecule. While the dibasic acids useful for this invention will contain from about 18 to 52 carbon atoms, they preferably will be $C_{21-36}$ dicarboxylic acids or mixtures thereof. Some monobasic acids and/or polybasic acids may be present with the dibasic acid, however, the dicarboxylic acid content should be at least 70% by weight of the acid mixture, and more preferably, greater than 80% by weight.

Dicarboxylic acids suitable for the preparation of the polyamide additives are obtainable by any of several processes known to the industry. The dibasic acids can be obtained from suitable organic compounds, for example, by ozonolysis of unsaturated carboxylic acids or by the catalytic oxidation of saturated and/or unsaturated hydrocarbons. They can also be obtained by oxidation of methyl- or formyl-branched acids such as isostearic acid or formylstearic acid. Carboxystearic acids such as heptadecane-1,3-dicarboxylic acid and heptadecane-1,9-dicarboxylic acid as well as other isomeric acids can be produced in this manner. The radical addition of a short-chain aliphatic acid to an unsaturated fatty acid can also yield useful dibasic acids. Dicarboxylic acids can also be obtained by the addition of acrylic acid or methacrylic acid and a monobasic acid containing multiple unsaturation which is conjugated or capable of rearranging to the conjugated form. For example, when linoleic acid and acrylic acid are reacted a dibasic acid of the formula

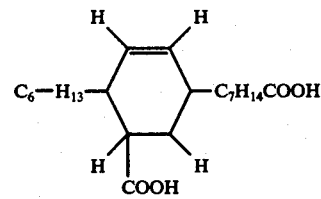

is obtained. These adduct acids are very useful for the preparation of the polyamide resins employed for this invention.

Especially useful carboxylic acids are polymeric fatty acids obtained by the dimerization of unsaturated monocarboxylic acids containing 16 to 26 carbon atoms, such as oleic acid, linoleic acid, linolenic acid and eleostearic acid. Dicarboxylic acids produced in this manner, that is, when two moles of unsaturated monocarboxylic acid are joined, are referred to as dimer acid. Processes for the production of dimer acids are well known to the art and by way of illustration reference may be had to U.S. Pat. Nos. 2,793,219 and 2,955,121.

Dimer acids obtained by the dimerization of $C_{18}$ acids such as oleic acid, linoleic acid and mixtures thereof (e.g. tall oil fatty acids) are especially useful and advantageously employed for the preparation of the polyamide additives. Such dimer acids have as their principal component $C_{36}$ dicarboxylic acid and typically have an acid value in the range 180–215, saponification value in the range 190–205 and neutral equivalent from 265–310. Dimer acids containing unsaturation may be hydrogenated prior to use. Dimer acids containing less than 25% by weight by-product acids, including monobasic acids, trimer acids or high polymer acids, provide especially useful polyamide resins for this invention and it is particularly advantageous if the $C_{36}$ polymeric acid has been hydrogenated and molecularly distilled or otherwise purified to increase the $C_{36}$ dimer content to 90% or more.

Reacted with the long-chain, high molecular weight dibasic acid is an aliphatic diamine corresponding to the formula $H_2N-(CH_2)_n-NH_2$ where n is an integer from 2 to about 10 and preferably from 2 to 6. Useful saturated aliphatic diamines of the above type include ethylenediamine, propylenediamine, tetramethylenediamine, pentamethylenediamine, hexamethylenediamine, octamethylenediamine, decamethylenediamine and the like. Mixtures of one or more of these diamines may be used, in fact, polyamides prepared from a mixture of ethylenediamine and hexamethylenediamine form a preferred embodiment of this invention. In addition to the above-mentioned saturated aliphatic diamines, which are essential if suitable polyamide additives are to be obtained, one or more additional diamines may also be used but should not constitute greater than about 30 weight percent of the total diamine charge. Preferably such diamines will comprise less than 10 weight percent of the total diamine and include but are not limited to the following: 3,4,5-trimethylhexamethylenediamine, dimer diamine (diamines of dimer acids obtained by the polymerization of oleic acid or similar unsaturated acids), p-xylylenediamine, p-phenylenediamine, 1-methyl-2,4-diaminobenzene, N,N'-dimethylphenylenediamine, 1,4-diaminocyclohexane, bis-(p-aminocyclohexyl) methane, N,N'-dimethyl-1,4-diaminocyclohexane, piperazine, 2,5-dimethylpiperazine, isophoronediamine, N-oleyl-1,3-diaminopropane, N-coco-1,3-propylenediamine, methylimino-bis-propylamine and the like.

In addition to the long-chain, high molecular weight dibasic acids, there may also be present and it is often advantageous to include a short-chain saturated aliphatic dibasic acid containing from 2 to 13 carbon atoms and, more preferably, from 6 to 13 carbon atoms. The amount of the short-chain dibasic acids should not, however, exceed about 30 weight percent of the total dibasic acid charge. Useful short-chain acids which can be used for the preparation of the polyamide additive include oxalic acid, malonic acid, succinic acid, glutaric acid, adipic acid, suberic acid, pimelic acid, azelaic acid, sebacic acid, dodecanedioic acid, brassylic acid and the like.

Polyamide additives obtained by the reaction of the above-described reactants and useful for this invention have number average molecular weights from 5,000 up to about 50,000 and, more preferably, in the range 10,000 to 35,000. The polyamide resins generally have softening points from about 100° C to 240° C, however, superior results are obtained when the softening point of the resin is in the range 150°–210° C. These polyamides should have amine values less than 3, and preferably less than one, if they are to be useful additives for the nylons. Such resins are obtained by reacting essentially stoichiometric amounts of the diamine or mixture of diamines with the high molecular weight dibasic acid or mixture of high molecular weight and short-chain dibasic acids. In other words a balanced or essentially balanced reaction is necessary and the reaction should be carried to completion or near completion, i.e. essentially zero amine value.

As indicated the equivalents ratio of the diamine (total) and high molecular weight dibasic acid (total) will be essentially 1:1 to obtain the polymeric additives. The dicarboxylic acid charge may contain up to about 30 weight percent of a saturated $C_{2-13}$ aliphatic dicarboxylic acid. Preferably saturated aliphatic dibasic acids containing from about 6 to 13 carbon atoms will be present in an amount from about 1 to 20 weight percent of the total dibasic acid charge. While a single diamine component may be employed for the preparation of the polymeric additive, mixtures of diamines provide especially useful polyamides particularly when the diamines differ by at least three carbon atoms. In such mixtures the longer chain diamine constitutes from about 5 to 35% of the total diamine equivalents and, more preferably, from about 10 to 30 equivalents percent. The shorter chain diamine will make-up the remainder of the diamine charge. Mixtures of ethylenediamine and 1,6-hexamethylenediamine have been found to be particularly advantageous and form a preferred embodiment of this invention especially when reacted in the above-defined ratios with a mixture of $C_{36}$ dimer acid and azelaic, sebacic, dodecanedioic or brassylic acids. While considerable compositional variation is possible with the polyamide additives, the amount and type of the various dibasic acid and diamine components making up the charge are designed to provide a homogeneous product with the highest possible viscosity and melting point for that particular molecular weight.

The polyamides are obtained by heating the diamine and dicarboxylic acid components in a suitable reactor arranged to permit water of condensation formed during the reaction to be removed from the system. A variety of condenser/trap arrangements are acceptable for this purpose. The reaction can be conducted as a batch, continuous or semi-continuous operation. Reaction is achieved by heating the reaction mixture in the temperature range 150°–280° C, preferably 180°–250° C, until evolution of water ceases and a negative test for free amine is obtained. Reaction times can vary from 4 to 24 hours depending on the particular reactants employed and the maximum reaction temperature. More usually reaction times range from 6 to 10 hours. An inert gas may be bubbled through the reaction mixture to facilitate removal of water. During the latter stages of the reaction it may be advantageous to reduce the pressure to remove the last traces of water. At the end of the reaction the resin may be cooled and used as such or stabilizers, ultraviolet absorbers or the like added.

The polyamide additives are useful with a wide variety of nylon plastics as already pointed out. While the polyamide additive can constitute from about 0.01 to 20% by weight of the blend, it will more preferably be present in an amount from about 0.1 to 10%. The additives can be blended with the nylons using conventional processing equipment and do not require special mixing or handling. Furthermore, the polyamide additives are compatible with other known additives typically employed in nylon formulations such as stabilizers, lubricants, plasticizers, delusterants, dyes, pigments, antistatic agents and the like. The additives of this invention are also useful with filled compositions such as glass fiber or mineral filled resins.

The following examples will illustrate the invention more fully. In these examples all parts and percentages are given on a weight basis unless otherwise indicated.

EXAMPLE I

A glass reactor equipped with a stirrer, nitrogen inlet, thermometer and condensor fitted with a water trap was charged with 0.242 equivalent dimer acid (Empol ®1010 dimer acid containing 97% $C_{36}$ dibasic acid) and 0.161 equivalent azelaic acid. Several drops 50% aqueous hypophosphorous acid were added and the reaction mixture heated to 180°–190° C with stirring under a slight nitrogen flow. A mixture of diamines consisting of 0.073 equivalent hexamethylenediamine and 0.322 equivalent ethylenediamine was slowly added over a period of about one hour while maintaining the temperature and removing water of condensation. The reaction mixture was heated to about 230°-250° C until most of the water was removed and a vacuum of 5-20 Torr then applied to the system to remove the final traces of water. The vacuum was broken with nitrogen, the product discharged from the reaction vessel and cooled. The resulting polyamide had a softening point of 190° C (ASTM E28-67), 0.7 amine value (ASTM D2074-66), viscosity of 76 poise at 220° C (ASTM D445-65) and tensile strength (psi) and elongation (%) of 1800 and 400,respectively, determined using ASTM test method D882-67.

EXAMPLE II

The polyamide additive of Example I was blended with a commerical grade nylon 6. The blends were formulated to contain 2 and 10 weight percent of the polyamide additive. In addition to the polyamide additive 6 grams zinc stearate per 100 pounds resin was also employed as an external lubricant. The components were blended in a high-speed Henschel mixer for two minutes and the blends extruded using a three inch, 24 to 1, extruder with an 8-hole die. Nylon 6 containing only the zinc stearate was also extruded as a control. Extrusion conditions and outputs were as follows:

| Resin: | Temperature (° F) | | | | | Screw Speed (rpm) | Power (amps) | (lbs/ hr) |
| --- | --- | --- | --- | --- | --- | --- | --- | --- |
| | Zone 1 | Zone 2 | Zone 3 | Zone 4 | Die | | | |
| % Polyamide Additive: | | | | | | | | |
| 0 | 420 | 450 | 450 | 450 | 450 | 40 | 27 | 120 |
| 2 | 420 | 435 | 435 | 435 | 435 | 40 | 24 | 125 |
| 2 | 420 | 430 | 430 | 430 | 430 | 50 | 27 | 150 |
| 10 | 420 | 435 | 435 | 435 | 435 | 40 | 25 | 120 |
| 10 | 410 | 420 | 420 | 420 | 420 | 56 | 27 | 170 |

From the above data it is readily apparent that by the addition of the polyamide additive the extrusion efficiency of nylon 6 is greatly improved. It is also apparent that greater output can be achieved without increasing the power requirements of the extruder or, conversely, the same output can be obtained with reduced power consumption. From the data it can be seen that by using only 2% of the polyamide additive a 4% increase in output was obtained with an 11% reduction in power consumption while also reducing the temperature requirements. Also, if the processor so desires, the resin can be processed at much lower temperatures using the same amount of power while still obtaining a 25% increase in output. In addition to those advantages the polyamide blends were easily pelletized and there was no substantial decrease in the rate of crystallization of the nylon 6.

In addition to being an effective processing aid at low levels the polyamide additive does not significantly modify the mechanical and thermal properties of the nylon 6. To demonstrate this point, the physical properties of the modified resins were obtained and compared with the properties of the control resin. Results were as follows:

| | Unmodified Nylon 6 | Nylon 6 With 2% Additive | Nylon 6 With 10% Additive |
| --- | --- | --- | --- |
| Impact (ft. lbs/inch notch) ASTM D256 | 0.95 | 1.04 | 0.80 |
| Tensile Strength At Yield (psi) - ASTM D638 | 11,000 | 10,700 | 9,300 |
| Elongation At Fail (%) | 50 | 62 | 56 |

| | Unmodified Nylon 6 | Nylon 6 With 2% Additive | Nylon 6 With 10% Additive |
| --- | --- | --- | --- |
| ASTM D638 Elastic Modulus (psi) ASTM D638 | 365,000 | 365,000 | 320,000 |
| Flexural Strength At Yield (psi) - ASTM D790B | 14,000 | 14,000 | 12,000 |
| Flexural Modulus (psi) ASTM D790B | 360,000 | 365,000 | 320,000 |

Also, the melt point of the blend, as determined by differential scanning calorimetry, was not affected by the incorporation of the polyamide additive even at the 10% level. It is apparent from the above data that a very significant increase in the impact strength of nylon 6 is possible by the addition of low levels of the polyamide additive.

The polyamide additive was also blended with nylon 6 at a 20 weight percent level and the blend extruded (temperature profile 410° F, 420° F, 420° F, 420° F and 420° F). No problems were encountered during the extrusion, however, a slightly longer quench time was required prior to pelletization.

EXAMPLE III

To demonstrate this point and further point out the effectiveness of the polyamide additives a mineral filled composition was prepared as follows:

| Nylon 6 | 69 parts |
| --- | --- |
| Talc | 30 parts |
| Polyamide Additive of Example I | 1 part |

The ingredients were blended in a Henschel high-speed mixer and the blend extruded using a 4 1/2 inch, 24 to 1 vented extruder having a temperature profile of 425° F, 440° F, 440° F, 440° F and 445° F. Good mixing with an output of 300 lbs/hr was obtained at a screw speed of 38 rpm (75 amps) using the blend containing the polyamide additive. The filled composition not containing the polyamide additive was difficult to extrude and marked variations in the output were obtained because of poor mixing.

EXAMPLE IV

Nylon 6,6 containing 2% by weight of the polyamide of Example I and 6 grams zinc stearate per 100 pounds of the resin was extruded in accordance with the procedure of Example II except that the extruder was fitted with a 4-hole die. Results were as follows:

| Resin: | Temperature (° F) | | | | | Screw Speed (rpm) | Power (amps) | Output (lbs/hr) |
| --- | --- | --- | --- | --- | --- | --- | --- | --- |
| | Zone 1 | Zone 2 | Zone 3 | Zone 4 | Die | | | |
| % Polyamide Additive: | | | | | | | | |
| 0 | 520 | 540 | 540 | 550 | 550 | 28 | 21 | 110 |
| 2 | 500 | 520 | 530 | 530 | 530 | 35 | 22 | 140 |
| 2 | 480 | 480 | 480 | 490 | 490 | 40 | 23 | 160 |

It is clear from the above results that the processability of nylon 6,6 is markedly improved by the addition of the polyamide additive. It is evident that a significantly lower temperature profile can be employed when extruding the blend. Also, output can be markedly increased with minimal increase in power consumption.

The data demonstrates that 27% increase in output is possible with only 4.8% increase in power consumption or it is possible to increase the output by 45% with only 10% power increase. These results are even more significant since the processing temperatures have also been lowered.

At the 2% level the polyamide additive did not adversely affect the mechanical properties of the nylon 6,6 as evidenced by the following comparative data:

|  | Unmodified Nylon 6,6 | Nylon 6,6 With 2% Additive |
|---|---|---|
| Impact (ft. lbs/inch notch) ASTM D256 | 0.99 | 0.85 |
| Tensile Strength At Yield (psi) - ASTM D638 | 11,700 | 11,600 |
| Elongation at Fail (%) ASTM D638 | 50 | 41 |
| Elastic Modulus (psi) ASTM D638 | 410,000 | 405,000 |
| Flexural Modulus (psi) ASTM D790B | 410,000 | 413,000 |

The melt point of the blend was essentially identical to that of the unmodified control resin. When the polyamide additive was incorporated in nylon 6,6 at 10 and 20 percent levels similar processing advantages were realized.

EXAMPLE V

A polyamide additive was prepared by reacting 0.289 equivalent $C_{36}$ dimer acid, 0.050 equivalent azelaic acid, 0.063 equivalent hexamethylenediamine and 0.240 equivalent ethylenediamine following the procedure of Example I. The resulting polyamide resin had a softening point of 137° C and tensile strength of 810 psi at 170% elongation and is a useful additive for nylon 6,9, nylon 6,10 and nylon 6,12 to improve the processing characteristics of the resins.

EXAMPLE VI

Following a procedure similar to that described in Example I, 0.261 equivalent $C_{36}$ dimer acid, 0.112 equivalent azelaic acid, 0.073 equivalent hexamethylenediamine and 0.292 equivalent ethylenediamine were reacted to produce a high molecular weight polyamide resin having a softening point of 175° C, tensile strength of 2000 psi and elongation of 320%. When this polyamide is incorporated in nylon 9, nylon 11 or nylon 12 at levels ranging from about 1% up to about 10% a marked improvement in the processing characteristics and rheological properties of the resin blends is obtained.

EXAMPLE VII

The composition of Example II (nylon 6 containing 20% of the polyamide additive) was extruded into monofilaments. The extrusion was carried out using a 2 1/2 inch extruder with a 4-hole die and temperature profile of 420° F, 440° F, 440° F, 440° F and 440° F. The filaments (initial gauge 0.080") were cold stretched at a 5:1 ratio to reduce the filaments to a gauge of 0.033 inch. The processability of the filaments was excellent and no difficuties were encountered during the extruding and drawing operations. Also, the draw tension required to stretch the filament was about half that required to produce a similar gauge filament with unmodified nylon 6. Similarly, a nylon 6 composition containing 10% polyamide additive was extruded into monofilaments without difficulty. These filaments showed improved stretchability and both the oriented and unoriented filaments exhibited useful characteristics.

EXAMPLE VIII

Blends of both nylon 6 and nylon 6,6 with the polyamide additive of Example I (2% level) were injection molded in accordance with the standard recommended practice for injection molding specimens of thermoplastic materials (ASTM D1136-63) using a mold design as shown in FIG. 4 of ASTM D647. The blends exhibited superior processability as compared to resins which did not contain the polyamide additive. Also, the character of the moldings obtained from the blends was significantly improved.

We claim:

1. A method for improving the flow characteristics and rheological properties of a nylon resin which comprises blending therewith from 0.01% to 20% by weight of a high molecular weight polyamide additive having an amine value less than 3 and obtained by the reaction of a high molecular weight aliphatic or cycloaliphatic dibasic acid containing from 18 to 52 carbon atoms and up to 30 weight percent, based on total dibasic acid charge, of a short-chain, saturated, aliphatic dibasic acid having from 2 to 13 carbon atoms with a stoichiometric amount of an aliphatic, saturated diamine having from 2 to 10 carbon atoms or a mixture of said diamines.

2. The method of claim 1 where the polyamide additive has a number average molecular weight from about 5,000 to 50,000 and a softening point in the range 100° C to 240° C.

3. The method of claim 1 wherein the nylon resin is selected from the group consisting of nylon 4, nylon 6, nylon 6,6, nylon 6,9, nylon 6,10, nylon 6,12, nylon 9, nylon 11 and nylon 12.

4. The method of claim 1 wherein the polyamide is derived from a high molecular weight dibasic acid containing 75% or more $C_{36}$ dimer acid obtained by the dimerization of $C_{18}$ unsaturated monocarboxylic acids.

5. The method of claim 4 wherein the high molecular weight dibasic acid has an acid value in the range 180 to 215, saponification value in the range 190 to 205 and neutral equivalent from 265 to 310.

6. The method of claim 5 wherein the high molecular weight dibasic acid is hydrogenated and contains 90% or more $C_{36}$ dimer acid.

7. The method of claim 4 wherein the short-chain, saturated, aliphatic dibasic acid contains from 6 to 13 carbon atoms and constitutes from 1 to 20 weight percent of the total dibasic acid charge and the diamine is a mixture of two diamines, said diamines differing by at least three carbon atoms with the longer chain diamine constituting from about 5% to 35%, based on equivalents, of the total diamine charge.

8. The method of claim 7 wherein the polyamide additive has a number average molecular weight in the range 10,000 to 35,000, a softening point in the range 150° C to 210° C and amine value less than 1.

9. The method of claim 8 wherein the nylon resin is selected from the group consisting of nylon 4, nylon 6, nylon 6,6, nylon 6,9, nylon 6,10, nylon 6,12, nylon 9, nylon 11 and nylon 12.

10. A thermoplastic polyamide resin blend having improved flow characteristics and rheological properties comprising 80% to 99.99% by weight of a nylon resin and 0.01% to 20% by weight of a polyamide additive having an amine value less than 3 and obtained by the reaction of a high molecular weight aliphatic or cycloaliphatic dibasic acid having from 18 to 52 carbon atoms and up to 30 weight percent, based on the total dibasic acid charge, of a short-chain, saturated aliphatic dibasic acid having from 2 to 13 carbon atoms with a stoichiometric amount of an aliphatic, saturated diamine having from 2 to 10 carbon atoms or a mixture of said diamines.

11. The resin blend of claim 10 wherein the nylon is selected from the group consisting of nylon 4, nylon 6, nylon 6,6, nylon 6,9, nylon 6,10, nylon 6,12, nylon 9, nylon 11, and nylon 12 and the polyamide additive has a number average molecular weight from about 5,000 to 50,000 and a softening point in the range 100° C – 240° C.

12. The resin blend of claim 11 wherein the polyamide additive is derived from a high molecular weight dibasic acid containing 75% or more $C_{36}$ dimer acid obtained by the dimerization of $C_{18}$ unsaturated monocarboxylic acids, 1 to 20 weight percent, based on the total dibasic acid charge, of a short-chain, saturated, aliphatic dibasic acid having from 6 to 13 carbon atoms and a mixture of two diamines, said diamines differing by at least three carbon atoms with the longer chain diamine constituting from about 5% to 35%, based on equivalents, of the total diamine charge.

13. The resin blend of claim 12 wherein the polyamide additive comprises from 0.1% to 10% by weight of the blend and has a number average molecular weight in the range 10,000 to 35,000, a softening point in the range 150° C to 210° C and amine value less than 1.

14. The resin blend of claim 13 wherein the polyamide is derived from a high molecular weight dibasic acid having an acid value in the range 180 to 215, saponification in the range 190 to 205 and neutral equivalent from 265 to 310 and the diamine is a mixture of ethylenediamine and hexamethylenediamine.

15. The resin blend of claim 14 wherein the high molecular weight dibasic acid is hydrogenated and contains 90% or more $C_{36}$ dimer acid.

* * * * *